(12) United States Patent
Copeland et al.

(10) Patent No.: US 7,363,751 B2
(45) Date of Patent: Apr. 29, 2008

(54) WOUND-IN TENON/WOUND-IN TENON COLLAR FOR ATTACHMENT OF LUMINAIRE

(75) Inventors: S. Douglas Copeland, Columbia, SC (US); Gerti Bajraktari, Newberry, SC (US); William Griffin, Irmo, SC (US); Gregory S Hosford, Columbia, SC (US)

(73) Assignee: Shakespeare Composite Structures, LLC, Newberry, SC (US)

( * ) Notice: Subject to any disclaimer, the term of this patent is extended or adjusted under 35 U.S.C. 154(b) by 0 days.

(21) Appl. No.: 11/555,771

(22) Filed: Nov. 2, 2006

(65) Prior Publication Data

US 2007/0058363 A1 Mar. 15, 2007

Related U.S. Application Data

(63) Continuation-in-part of application No. 11/220,259, filed on Sep. 6, 2005, now Pat. No. 7,284,356.

(51) Int. Cl.
*E04C 3/30* (2006.01)
(52) U.S. Cl. ...................................... 52/726.4
(58) Field of Classification Search ............... 362/410, 362/414, 415, 431, 153.1; 52/736.24, 736.4
See application file for complete search history.

(56) References Cited

U.S. PATENT DOCUMENTS

| 114,513 | A | 5/1871 | Aronson |
|---|---|---|---|
| 187,423 | A | 2/1877 | Shirley |
| 194,402 | A | 8/1877 | Barns |
| 357,217 | A | 2/1887 | McCallip |
| 680,342 | A | 8/1901 | Martin |
| 708,087 | A | 9/1902 | Smith |
| 1,045,852 | A | 12/1912 | Jones |
| 1,086,346 | A | 2/1914 | Babrick |
| 1,095,197 | A | 5/1914 | Entenmann |
| 1,201,108 | A | 10/1916 | Smith |
| 1,456,314 | A | 5/1923 | Key |
| 1,481,187 | A | 1/1924 | Clay |
| 1,776,682 | A | 9/1930 | King |
| 1,903,907 | A | 4/1933 | Riemenschneider |
| 1,906,508 | A | 5/1933 | Arbogast |
| 2,209,580 | A | 7/1940 | Sargent |
| 2,232,625 | A | 2/1941 | O'Keeffe |
| 2,318,396 | A | 5/1943 | Hoyt |
| 2,593,171 | A | 4/1952 | Morse |
| 2,782,295 | A | 2/1957 | Schwenkler |
| 2,791,241 | A | 5/1957 | Reed |
| 2,836,709 | A | 5/1958 | Dusen, Jr. |
| 3,083,796 | A | 4/1963 | Bell, Jr. |
| 3,094,238 | A | 6/1963 | Davidson |

(Continued)

*Primary Examiner*—John Anthony Ward
(74) *Attorney, Agent, or Firm*—Chad D. Bruggeman; John F. Salazar; Middleton Reutlinger (57) ABSTRACT

A modular pole system for a luminaire includes an elongated pole section formed from a continuous filament winding process with a tenon or tenon collar wound into a tip end of the pole section. A method for making a modular pole system includes placing a tenon or tenon collar over a trunion end of a mandrel and winding a pre-selected thickness of a filament along the length of the mandrel up to and including a pre-selected length of the tenon or tenon collar to produce a tenon or tenon collar wound into a pole section of the modular pole system.

24 Claims, 11 Drawing Sheets

U.S. PATENT DOCUMENTS

| | | |
|---|---|---|
| 3,096,029 A | 7/1963 | Berge |
| 3,158,349 A | 11/1964 | Bergstrom |
| 3,193,059 A | 7/1965 | Wallerstein, Jr. |
| 3,194,427 A | 7/1965 | Mullett et al. |
| 3,222,509 A | 12/1965 | Thedford |
| 3,278,743 A | 10/1966 | Franck |
| 3,325,950 A | 6/1967 | Pfaff, Jr. |
| 3,328,579 A | 6/1967 | Green |
| 3,335,534 A | 8/1967 | Hester et al. |
| 3,343,322 A | 9/1967 | Lurkis et al. |
| 3,362,737 A | 1/1968 | Cobb |
| 3,369,331 A | 2/1968 | Deskey et al. |
| 3,385,656 A | 5/1968 | Cuthbert |
| 3,400,905 A | 9/1968 | Dusen, Jr. |
| 3,403,520 A | 10/1968 | Goodman |
| 3,410,995 A | 11/1968 | Gray |
| 3,429,758 A | 2/1969 | Young |
| 3,481,369 A | 12/1969 | Ganahl |
| 3,563,502 A | 2/1971 | Dayson |
| 3,603,717 A | 9/1971 | Scott |
| 3,655,468 A | 4/1972 | Bastone et al. |
| 3,671,738 A | 6/1972 | Beachley |
| 3,803,400 A | 4/1974 | Ozawa |
| 3,813,837 A | 6/1974 | McClain et al. |
| 3,833,804 A | 9/1974 | Vesely |
| 3,853,418 A * | 12/1974 | Druin et al. .................. 404/1 |
| 3,866,034 A | 2/1975 | Russo |
| 3,886,024 A | 5/1975 | Chase |
| 3,886,029 A | 5/1975 | Poulsen |
| 3,896,858 A | 7/1975 | Whatley |
| 3,974,372 A | 8/1976 | Cochran |
| 4,028,542 A | 6/1977 | McReynolds, Jr. |
| 4,048,360 A | 9/1977 | Jonda |
| 4,070,567 A | 1/1978 | Crompton |
| 4,089,727 A | 5/1978 | McLain |
| 4,091,444 A | 5/1978 | Mori |
| 4,142,227 A | 2/1979 | Aikens |
| 4,166,537 A | 9/1979 | Fortunato |
| 4,200,906 A | 4/1980 | Santilli |
| 4,201,823 A | 5/1980 | Russell |
| 4,246,732 A * | 1/1981 | Frehner ...................... 52/726.4 |
| 4,262,047 A | 4/1981 | Barnett et al. |
| 4,269,010 A | 5/1981 | Glass |
| 4,319,312 A | 3/1982 | de Vos et al. |
| 4,336,868 A | 6/1982 | Wilson et al. |
| 4,343,567 A | 8/1982 | Sarver et al. |
| 4,381,960 A * | 5/1983 | Pinter et al. ................ 156/175 |
| 4,388,787 A | 6/1983 | Milbright |
| 4,395,750 A | 7/1983 | Scheidemann et al. |
| 4,445,163 A | 4/1984 | Ziaylek, Jr. |
| 4,462,068 A | 7/1984 | Shadwick |
| 4,471,411 A | 9/1984 | Graham et al. |
| 4,488,696 A | 12/1984 | Sauber |
| 4,523,263 A | 6/1985 | Poyer |
| 4,548,377 A | 10/1985 | Huel |
| 4,564,890 A | 1/1986 | Poyer |
| 4,617,768 A | 10/1986 | Gebelius |
| 4,621,662 A | 11/1986 | Olry |
| 4,622,086 A | 11/1986 | Puck et al. |
| 4,658,335 A | 4/1987 | Culler |
| 4,701,577 A | 10/1987 | Bourrieres |
| 4,705,425 A | 11/1987 | Okawa |
| 4,784,351 A | 11/1988 | Eickmann |
| 4,803,819 A | 2/1989 | Kelsey |
| 4,858,877 A | 8/1989 | Carter |
| 4,920,715 A | 5/1990 | Parsons et al. |
| 4,921,557 A | 5/1990 | Nakamura |
| 4,947,307 A | 8/1990 | Quiogue |
| 4,951,182 A | 8/1990 | Simonson et al. |
| 4,969,074 A | 11/1990 | Davis et al. |
| 4,972,301 A | 11/1990 | Kasboske |
| 5,028,464 A | 7/1991 | Shigetoh |
| 5,040,917 A | 8/1991 | Camuffo |
| 5,055,987 A | 10/1991 | Ellson et al. |
| 5,060,437 A | 10/1991 | Parsons et al. |
| 5,062,029 A | 10/1991 | Engel |
| 5,081,569 A | 1/1992 | Quiogue et al. |
| 5,086,379 A | 2/1992 | Denison et al. |
| 5,099,405 A | 3/1992 | Gehly et al. |
| 5,183,330 A | 2/1993 | Rishel et al. |
| 5,197,819 A | 3/1993 | Hughes |
| 5,220,744 A | 6/1993 | Kendall |
| 5,228,260 A | 7/1993 | Dziedzic |
| 5,274,537 A | 12/1993 | Altman |
| 5,289,358 A | 2/1994 | Halemeier |
| D348,745 S | 7/1994 | Ewing et al. |
| 5,398,180 A | 3/1995 | Lee |
| 5,433,333 A | 7/1995 | Martell |
| 5,492,579 A | 2/1996 | Hosford et al. |
| 5,499,885 A | 3/1996 | Chapman |
| 5,504,397 A | 4/1996 | Chien |
| 5,505,036 A | 4/1996 | Wiles |
| 5,513,477 A | 5/1996 | Farber |
| 5,572,846 A | 11/1996 | Sosa |
| 5,625,988 A | 5/1997 | Killick |
| 5,701,236 A | 12/1997 | Viviano |
| 5,704,187 A | 1/1998 | Hosford et al. |
| 5,704,580 A | 1/1998 | Peery, Jr. |
| D390,994 S | 2/1998 | Ewing et al. |
| D390,995 S | 2/1998 | Ewing et al. |
| D391,383 S | 2/1998 | Ewing et al. |
| 5,761,875 A | 6/1998 | Oliphant et al. |
| 5,775,035 A | 7/1998 | Papin |
| D400,277 S | 10/1998 | Ewing et al. |
| 5,833,351 A | 11/1998 | Marsh |
| 5,870,877 A | 2/1999 | Turner |
| 5,887,856 A | 3/1999 | Everly, II |
| 5,918,849 A | 7/1999 | Bliss |
| 5,941,485 A | 8/1999 | Davidson et al. |
| 5,954,426 A | 9/1999 | Whittington |
| 6,027,228 A | 2/2000 | Adams et al. |
| 6,033,089 A | 3/2000 | Tesauro |
| 6,152,579 A | 11/2000 | Reed et al. |
| 6,155,017 A | 12/2000 | Turner |
| 6,164,803 A | 12/2000 | Reniger et al. |
| 6,167,673 B1 | 1/2001 | Fournier |
| 6,240,689 B1 | 6/2001 | Haddad et al. |
| 6,322,863 B1 | 11/2001 | Kubicky |
| 6,327,833 B1 | 12/2001 | Miskelley et al. |
| 6,363,644 B1 | 4/2002 | Frost |
| 6,389,760 B1 | 5/2002 | McDonnell |
| 6,585,398 B1 | 7/2003 | Haddad |
| 6,851,838 B2 | 2/2005 | Haddad et al. |
| RE38,767 E | 8/2005 | Wdell et al. |

* cited by examiner

WOUND-IN TENON/WOUND-IN TENON COLLAR FOR ATTACHMENT OF LUMINAIRE

CROSS-REFERENCE TO PRIOR APPLICATION

This is a continuation-in-part of U.S. patent application Ser. No. 11/220,259, filed Sep. 6, 2005.

BACKGROUND OF THE INVENTION

1. Field of the Invention

The present invention relates to a modular pole system for receipt and support of a luminaire. More particularly, the present invention relates to a modular pole system which includes a wound-in tenon or wound-in tenon collar formed from a continuous filament winding process for subsequent support of a luminaire thereon.

2. Prior Art

Full length lighting systems usually include an elongated cast iron or other metalized products in pole shape with a tenon placed or attached to the upper end of the elongated pole for receipt of a luminaire or lighting fixture thereon. These full length lighting systems are generally used outdoors where they are either mounted onto concrete bases or embedded into the earth with the lighting fixture attached to the upper end thereof. In the construction of these full length lighting systems, the metal poles receive one end of a tenon on the upper end of the pole and the tenon is provided with an upper portion specifically designed for the attachment of a lighting fixture thereon. The generally accepted method of attaching a luminaire to a pole is to bond a steel sleeve (tenon) of a pre-selected inside diameter over the pole, and then fit the luminaire over the outside of the sleeve. The luminaire is generally attached with set screws.

SUMMARY OF THE INVENTION

It is an object to provide a modular pole system for receipt of a luminaire or lighting fixture thereon.

Another object is to provide a modular pole system for a luminaire which includes an elongated pole section formed from a continuous filament winding process.

It is also an object to provide a fiberglass pole having a tenon or tenon collar wound directly into the tip end of the pole and held in place with continuous glass reinforcement.

Yet another object to provide a modular pole system, as aforesaid, which utilizes a tenon collar capable of handling applications that increase the required load capacity of the modular pole system.

It is even a further object to prepare a modular pole system which is an electrical insulator and also has improved impact resistance.

More particularly, one embodiment relates to a modular pole system for a luminaire which includes an elongated pole section formed from a continuous filament winding process with a tenon or tenon collar wound into a first or upper end of the pole section.

Even more particularly, another embodiment is directed to a method of manufacturing a modular pole system wherein a tenon or tenon collar is placed over a trunion end of a mandrel and a pre-selected thickness of a filament is wound along the length of the mandrel up to and including a pre-selected length of the tenon or tenon collar to produce a tenon or tenon collar wound into a pole section of the wound-in filament.

Other objects and advantages of the embodiments of the present invention will appear from the following description and appended claims, reference being had to the accompanying drawings forming a part of the specification wherein like reference characters designate corresponding parts into several views.

DESCRIPTION OF THE PREFERRED EMBODIMENTS

Figure 1:
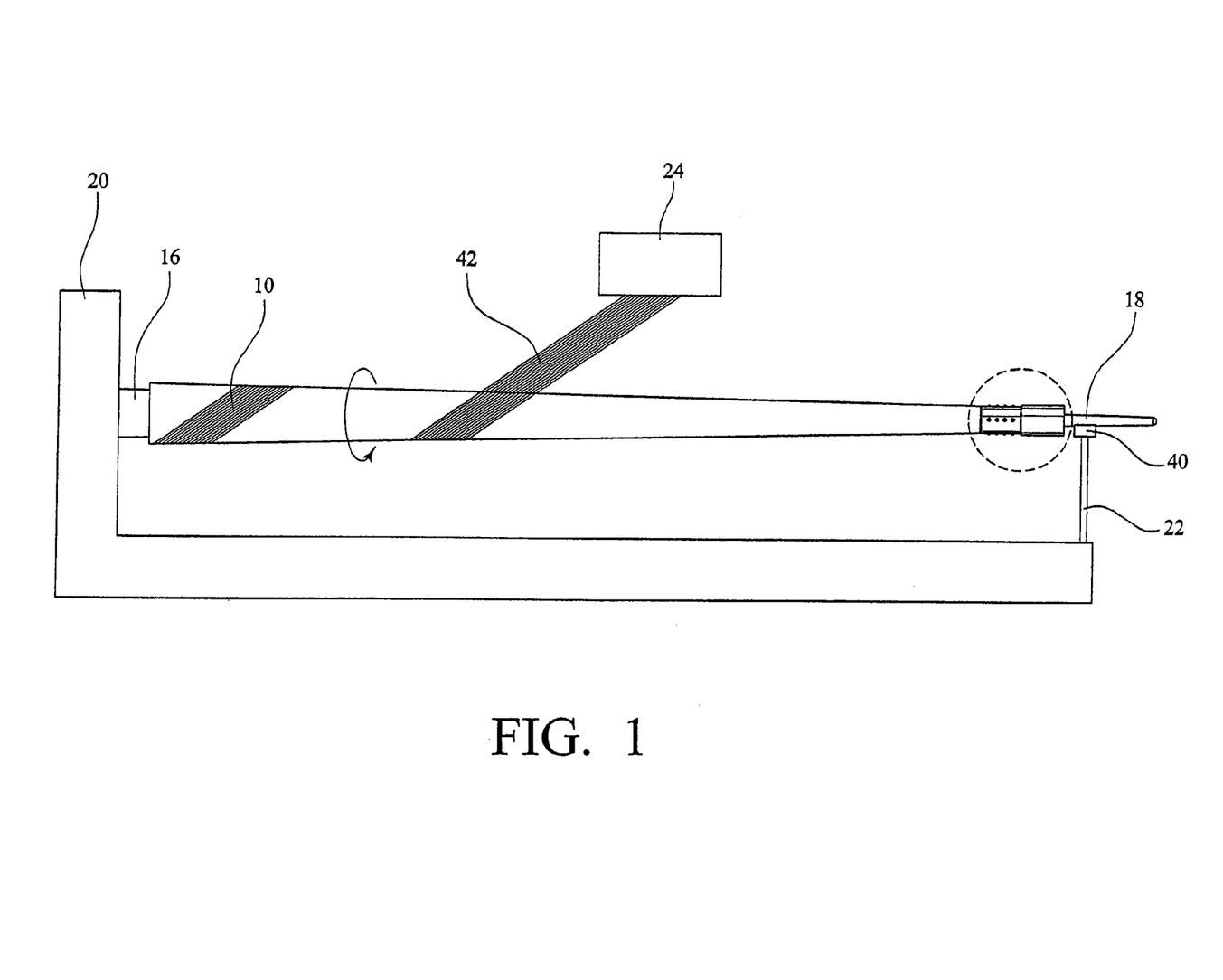
FIG. 1 is a schematic construction of a fibrous filament winding apparatus showing the manufacturing of a wound-in tenon.

FIG. 1 illustrates one preferred method for manufacturing a modular pole system of the present invention. As shown, a mandrel 16 having a trunion 18 at one end thereof, is supported by a vertically extending support 20 at an opposed end through which the rotating mandrel 16 is mounted. The mandrel 16 is rotated by appropriate winder motors and controls (not shown) well known in the art. The one end of the mandrel 16 includes a trunion 18 which fits within a vertically movable support 22 which includes rollers 40 upon which the trunion 18 is received. The vertically movable support 22 includes appropriate prior art means for moving the rollers up and down which enables the removal of a continuous filament pole, identified by the numeral 10, upon completion of winding a tenon 12 (FIGS. 2, 2A) therein.

In the manufacturing of a modular pole system of the present invention, as illustrated in FIG. 1, a mandrel 16 includes a trunion 18 at one end, the trunion 18 being integral with the mandrel 16. The mandrel 16 is rotated at a pre-selected rate and receives filaments 42 from a longitudinally movable carriage 24 which is disposed above the rotating mandrel 16. Preferably, filament 42 are fiberglass or other filaments with electrical insulating properties used in the manufacturing of a continuous filament pole 10. The mandrel 16 is rotated at a pre-selected speed and the carriage 24 moves longitudinally along the mandrel 16 from a selected location adjacent the support 20 to a pre-selected position adjacent to the vertically movable support 22.

Figure 2:
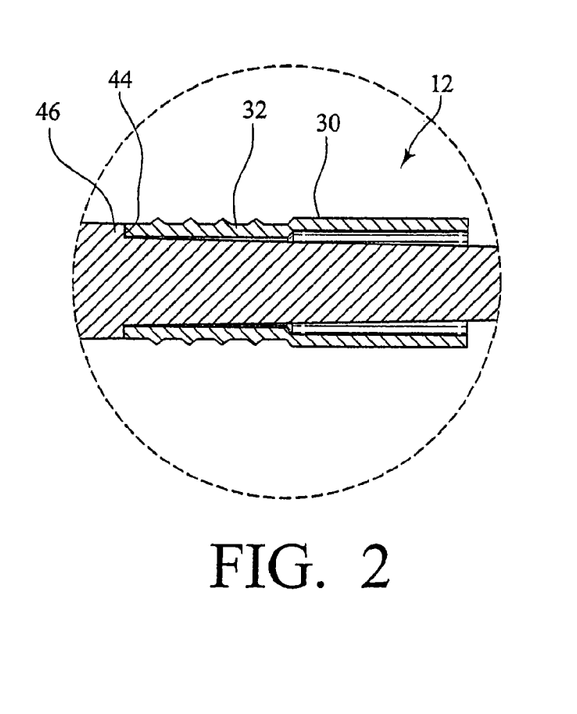
FIG. 2 is a sectional view of a tenon over a trunion end of a mandrel prior to winding the tenon into a continuous filament wound pole.
Figure 2A:
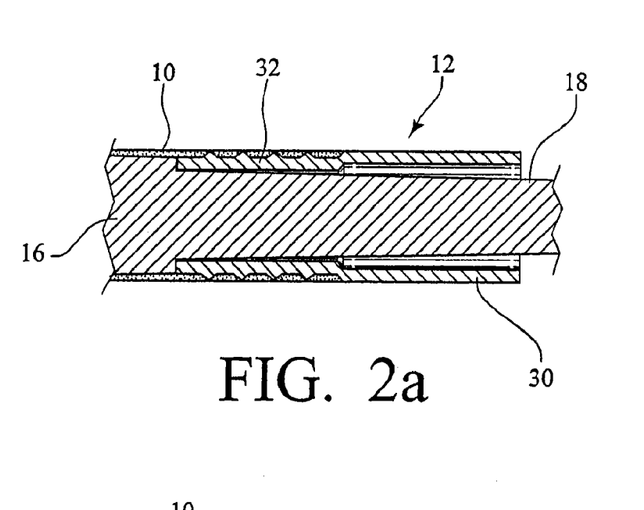
FIG. 2A is a sectional view showing a tenon on a trunion after being wound into a continuous filament wound pole.

With continued reference to FIG. 1, tenon 12 (FIG. 2) is placed onto a trunion 18 when the vertically movable support 22 is in a lowered position. The vertically movable support 22 is then moved into a raised position which is in horizontal alignment with the mandrel 16 at its mounting position within the vertical support system 20. The tenon 12, as best shown in FIG. 2, has an inside diameter approximately the same as the outside diameter of the trunion 18 and the tenon 12 has a trunion receiving or first end 30, and a second end 32 which abuts a terminating end 44 of the mandrel 16. The outer diameter of the first end 30 is of a pre-selected diameter substantially the same as the terminating end diameter of the fiberglass pole 10. The outside diameter of the second end 32 is substantially the same as the terminating end 44 of the mandrel 16. In the manufacturing of the fiberglass pole 10 including the wound-in tenon 12, the mandrel 16 is rotated at a pre-selected speed to receive the fiberglass filament 42 from a longitudinally movable carriage 24. The carriage 24 moves reciprocally along the mandrel at a predetermined linear speed thereby building the pole 10 into a plurality of filament layers thick. In a preferred embodiment, the mandrel 16, which is usually from about 4 to 5 inches in diameter, is tapered toward the trunion end 18 at a pre-selected constant taper usually from about 0.12 inches per foot to about 0.16 inches per foot. The terminating end of the mandrel portion will usually be about 2.2 to 2.4 inches in diameter and the trunion will be generally from about 1.8 to about 2.2 inches in diameter thereby providing a shoulder 46 at the junction of the mandrel 16 and the trunion 18 to which the tenon 12 abuts. Thus, the tenon 12 will generally have a first section 30 of an outside diameter of between 2.9 and 3.1 inches and an outside diameter of a second section 32 from about 2.5 to 2.7 inches. The outside diameter of the second section 32 is approximately the same as the tip end 44 of the mandrel 16. Thus, the thickness of the fiberglass will be of a continuous taper from about 0.125 to 0.250 inches. The inside diameter of the tenon 12 is substantially the same along the entire longitudinal length through the first section 30 and the second section 32 and is of a pre-selected diameter to fit on the trunion 18 as best shown in FIGS. 2, 2A.

Generally, prior to winding the filament 42 to the mandrel 16 a mold release agent is sprayed along the entire length of the mandrel 16 so that the release of the fiberglass pole 10 is easily accomplished upon completion of the manufacturer of the pole 10. Upon completion of the winding of the filaments 42 around the mandrel 16, the vertically movable support 22 is lowered and the rollers 40 disengage from the trunion 18 in a lowered position. The fiberglass pole 10 is then pushed, by any means known in the art, off of the mandrel 16.

Figure 3:
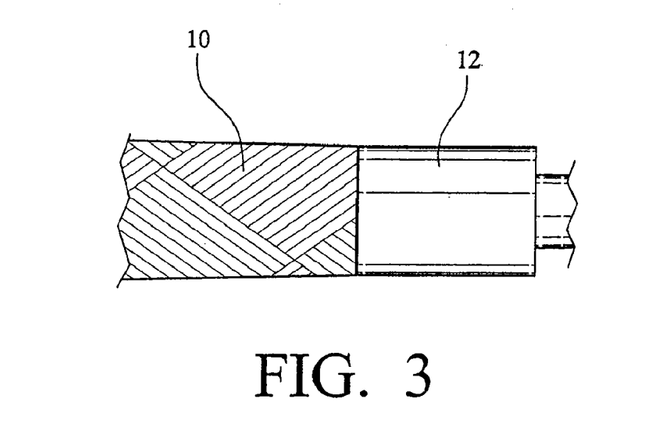
FIG. 3 is a side-view of a tip end of a fibrous pole with a tenon wound into the pole.

In FIG. 2 is shown a tenon 12 mounted onto a trunion 18 and is in an abutting relationship with a mandrel 16. The tenon's second end 32 abuts with the shoulder 46 of the tip end 44 of the mandrel 16. As shown in FIG. 2, the tenon 12 is in place on the trunion 18 prior to winding. As shown in FIG. 2A and FIG. 3, the tenon 12 is wound into the fiberglass pole 10, the fiberglass circumscribing the second end 32 of the tenon 12.

Figure 4:
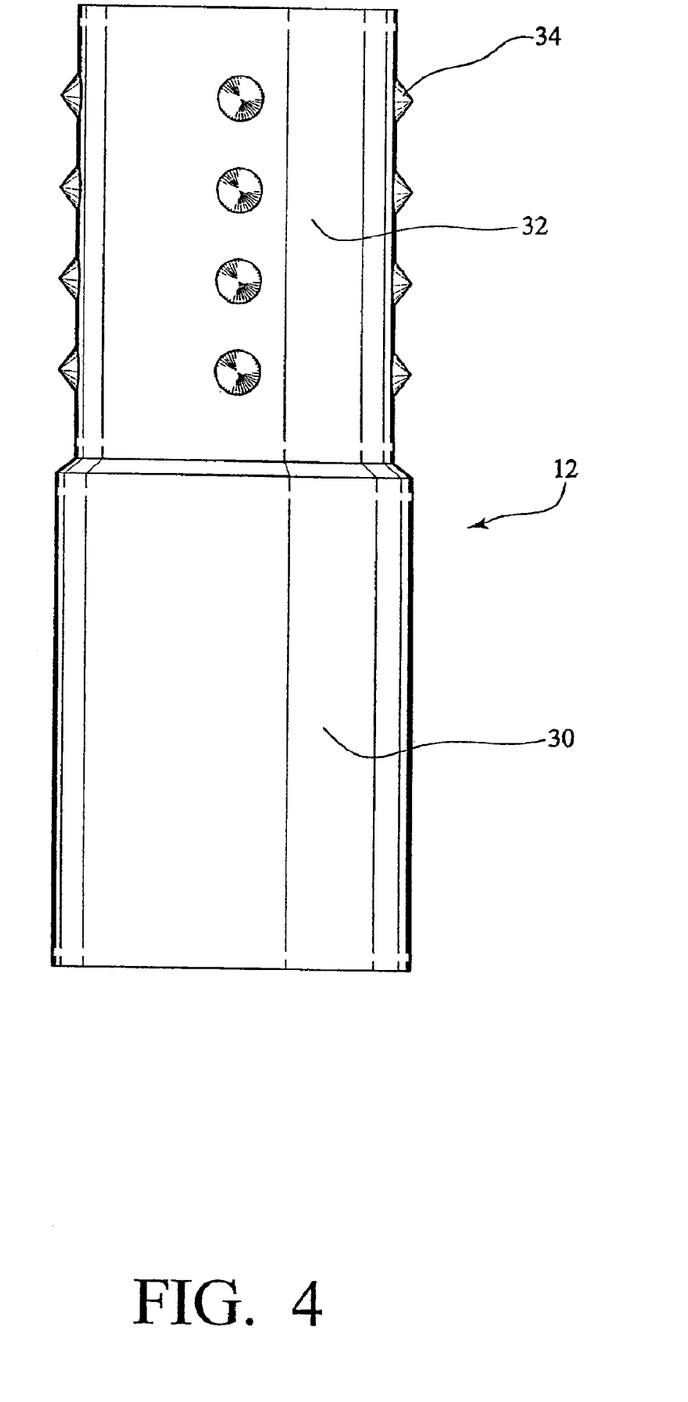
FIG. 4 is a side-view of a tenon for use in one embodiment of the present invention.

In FIG. 4 is shown a preferred tenon 12 for winding into a fiberglass pole 10 (FIG. 5) wherein the tenon 12 includes a first end 30 and a second end 32 with projections 34 extending along the outer surface of the second end 32 for securing the fiberglass filaments to the second end 32 upon the winding in of the fiberglass pole 10 to the tenon 12. With these projections 34, the tenon being wound directly into the tip end of the pole 10, the tenon is held in place with the projections 34 engaging with the continuous glass reinforcement.

Tenon 12 used in the present invention may be made from metallic materials as well as thermoplastics such as polybutylene, polyethylene terephthalate, polyamides, glass filled polyamides, and the like. The continuous filament pole 10 may be made from, preferably, fiberglass, epoxy resins or any other fibrous plastic material as well as spun metallic materials which have good insulating properties.

Figure 5:
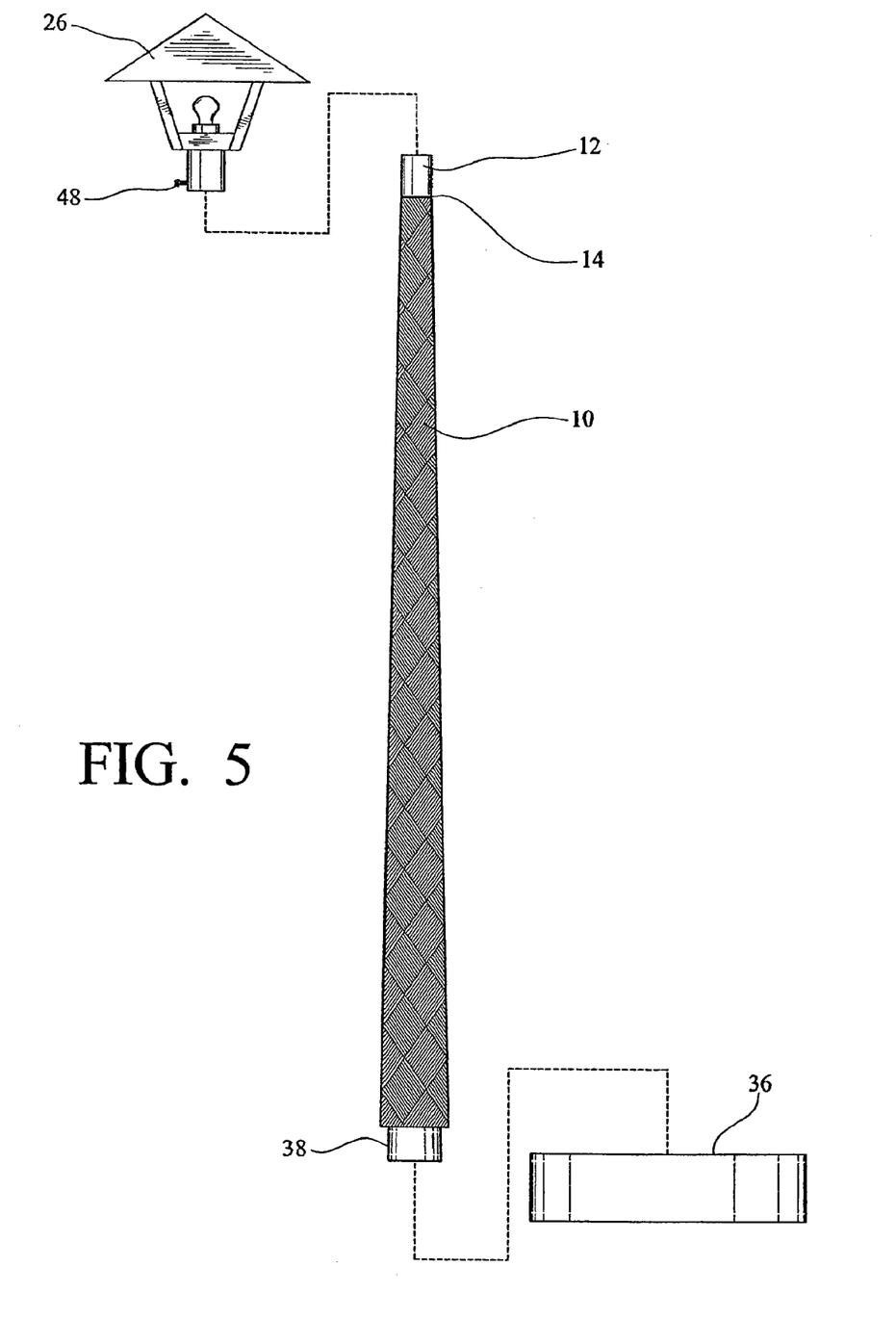
FIG. 5 is an exploded view of a modular pole system illustrating the attachment of a luminaire over a tenon.

As illustrated in FIG. 5, a completed continuous fibrous pole 10 includes a base mounting end 38 for receipt into a support 36 which may be concrete, the earth or the like or any other prior art bases upon which an elongated pole may be mounted. A luminaire, identified by the numeral 26, is mountable onto the tenon 12 usually by fitting over the tenon 12 and held in place with set screws 48.

Another embodiment of the present invention includes a two piece tenon assembly included in the modular pole system. The two piece tenon assembly includes a light attachment collar 60 inserted into a receptacle 51 of wound-in tenon collar 50, as shown in FIGS. 6-12. The wound-in tenon collar 50 incorporates the winding of the continuous filament just as the aforementioned wound-in tenon 12 described above. The wound-in tenon collar 50 incorporates, but is not limited to, a higher load capacity application as compared to the wound-in tenon 12 application as described above. Generally, the wound-in tenon collar 50, included in the modular pole system, can be used in street lighting where there is a luminaire extending parallel to the ground for some predetermined distance as shown in FIG. 12, thus creating an increased load on the two piece tenon assembly.

Figure 6:
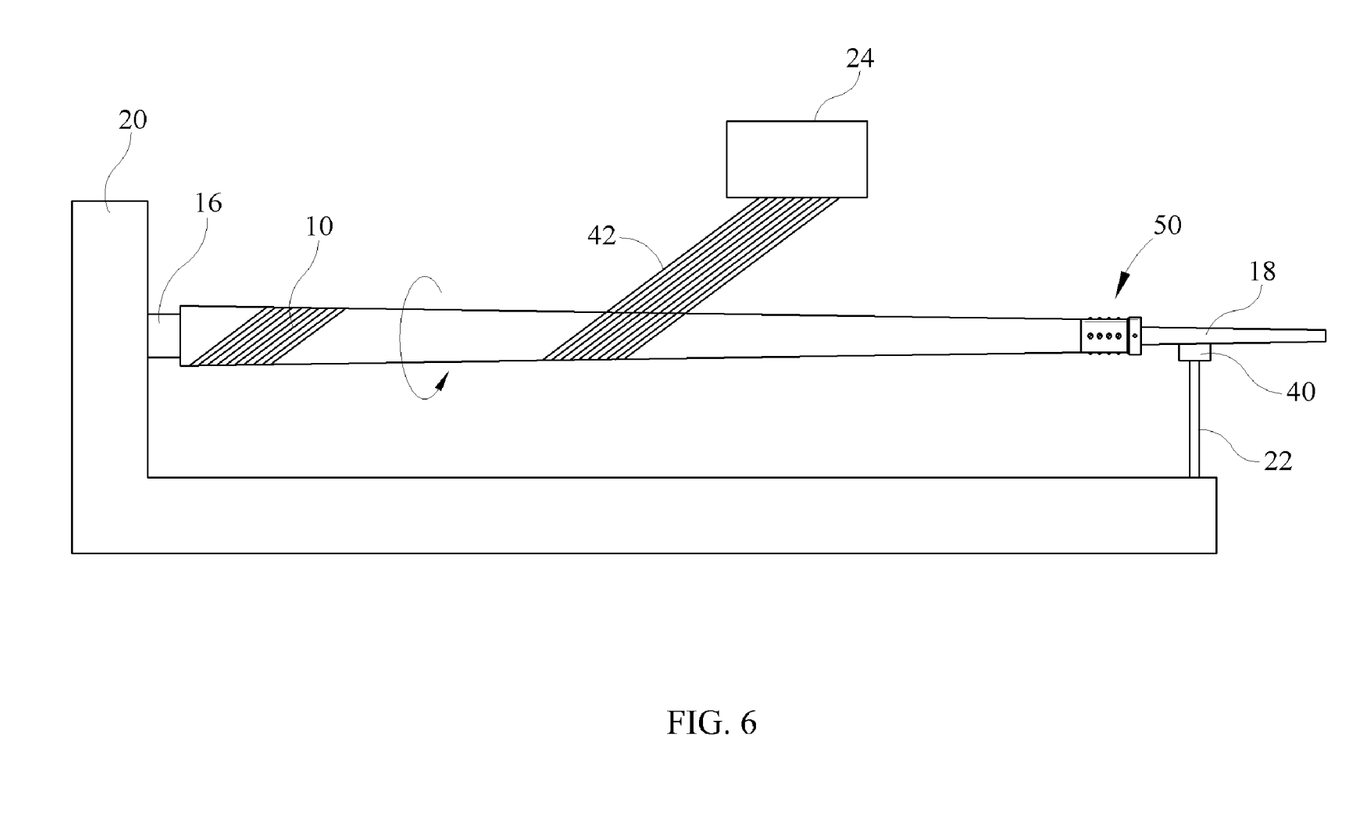
FIG. 6 is another embodiment of the schematic construction of a fibrous filament winding apparatus showing the manufacturing of a wound-in tenon collar.

FIG. 6 illustrates the method for manufacturing the wound-in tenon collar 50 of the two piece tenon assembly embodiment of the modular pole system. As shown, a mandrel 16 having a trunion 18 at one end thereof, is supported by a vertically extending support 20 at an opposed end through which the rotating mandrel 16 is mounted. The mandrel 16 is rotated by appropriate winder motors and controls (not shown) well known in the art. One end of the mandrel 16 includes a trunion 18 which is supported by a vertically movable support 22 carrying rollers 40. The vertically movable support 22 includes appropriate prior art means for moving the rollers up and down to facilitate the removal of a continuous filament pole 10, upon completion of the winding of a tenon collar 50 (FIGS. 7A, 8) therein.

In the manufacturing of a modular pole system with the wound-in tenon collar, as illustrated in FIG. 6, mandrel 16 including trunion 18 is rotated at a pre-selected rate and receives filaments 42 from a longitudinally movable carriage 24, which is disposed above the rotating mandrel 16. Filaments 42 are fiberglass or other types of filaments with electrical insulating properties which can be used in the manufacturing of a continuous filament pole 10. As mandrel 16 is rotated the carriage 24 moves longitudinally along the mandrel 16 from a first position adjacent the support 20 to a second position adjacent to the vertically movable support 22.

Figure 7:
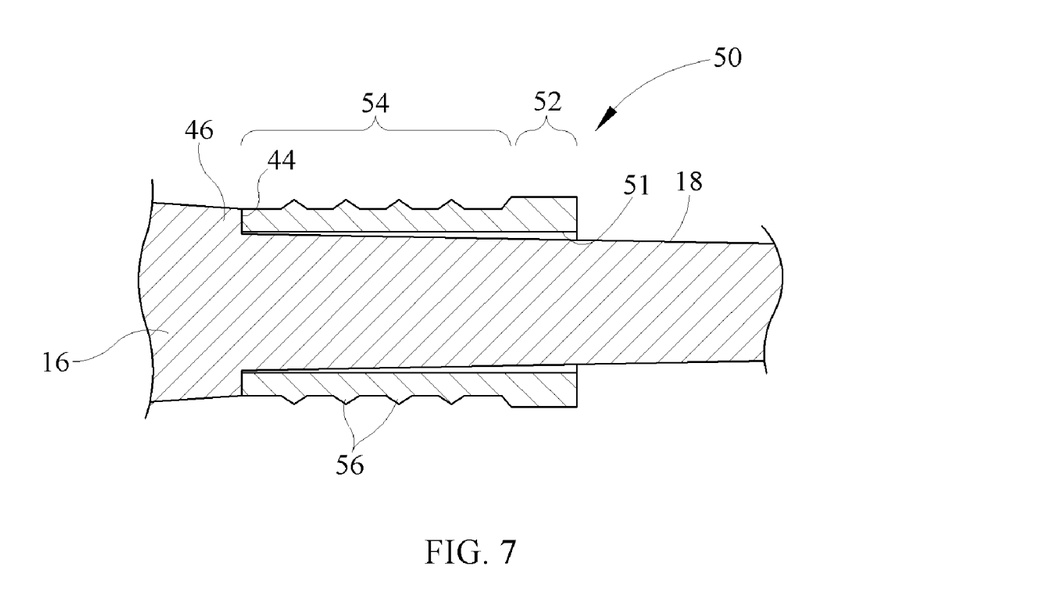
FIG. 7 is a sectional view of a tenon collar over a trunion end of a mandrel prior to the winding of the tenon collar into a continuous filament wound pole.
Figure 7A:
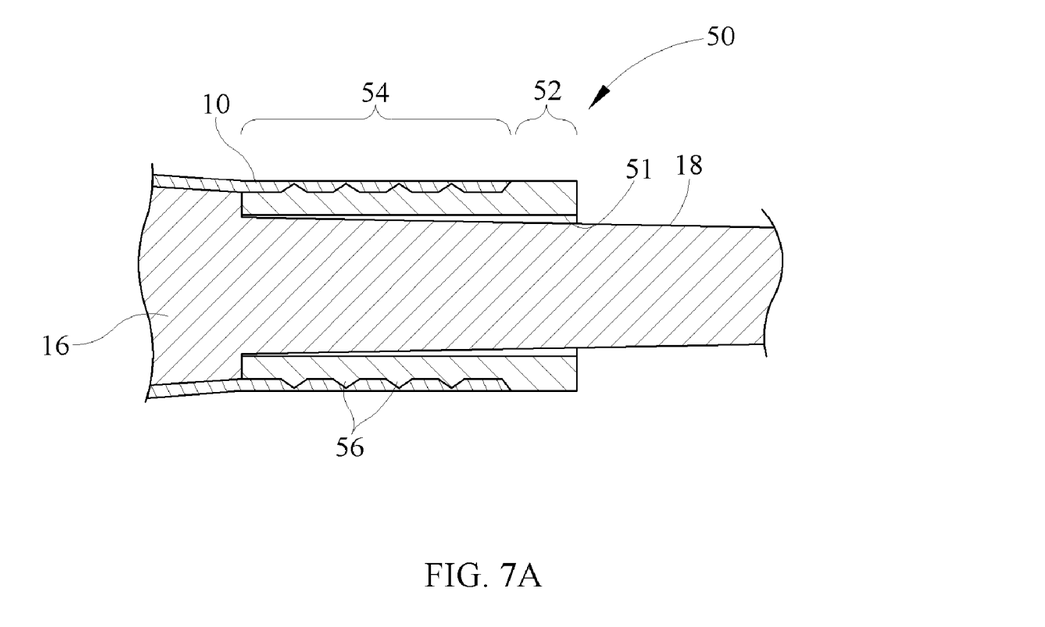
FIG. 7A is a sectional view showing a tenon collar on a trunion after being wound into a continuous filament wound pole.
Figure 8:
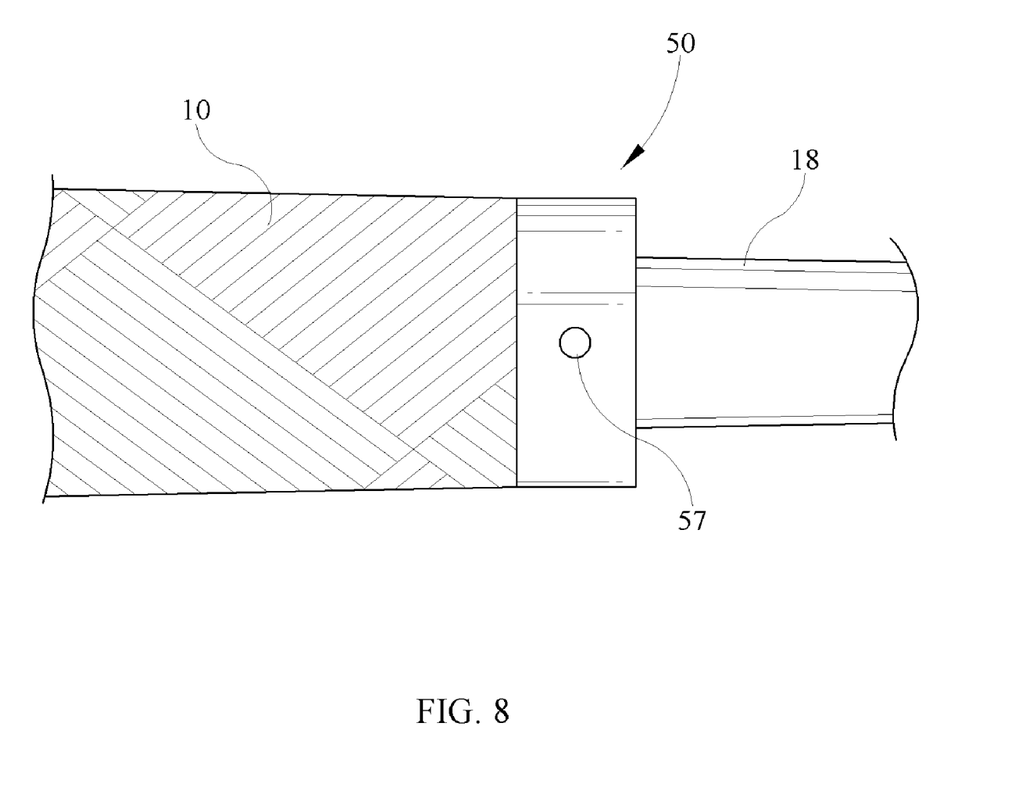
FIG. 8 is a side-view of a tip end of a fibrous pole with a tenon collar wound into the pole.

With reference to FIGS. 6 and 7, tenon collar 50 is placed onto trunion 18 while the vertically movable support 22 is in a lowered position. The vertically movable support 22 is then moved into a raised position which is in substantially horizontal alignment with mandrel 16 at its mounting position within vertical support system 20. The tenon collar 50, as shown in FIG. 7, has an inside diameter at a second end 54 which is approximately the same as the outside diameter of trunion 18. Tenon collar 50 also has a trunion receiving first end 52 and second end 54. Second end 54 abuts a shoulder 44 formed where mandrel 16 is narrowed to form truion 18. The outer diameter of first end 52 is substantially the same as the terminating end diameter of the fiberglass pole 10. The outside diameter of the second end 54 of the tenon collar 50 is substantially the same as the diameter of mandrel 16 at shoulder 44. In the manufacturing of the fiberglass pole 10 including the wound-in tenon collar 50, the mandrel 16 is rotated at a pre-selected speed to receive the fiberglass filament 42 from a longitudinally movable carriage 24. The carriage 24 moves reciprocally along the mandrel at a predetermined linear speed thereby building the pole 10 on mandrel 16 by winding on a plurality of filament layers. As shown in FIG. 7A and FIG. 8, the tenon collar 50 is also wound into the fiberglass pole 10, the fiberglass circumscribing the second end 54 of the tenon collar 50. In one embodiment, the mandrel 16, which is usually from about 4 to 5 inches in diameter, is tapered toward the shoulder 44 at a pre-selected constant taper usually from about 0.12 inches per foot to about 0.16 inches per foot. The diameter of the mandrel 16 at shoulder 44 will usually be greater than the respective diameter as trunion 18 being chosen so as to provide an approximately sized shoulder 44 at the junction of end 46 of mandrel 16 and the trunion 18 to provide an abutment for collar 50. The thickness of the fiberglass forming pole 10 including wound-in tenon collar 50 will be of a continuous taper from about 0.125 to 0.250 inches.

Generally, prior to winding the filament 42 around the mandrel 16, a mold release agent is sprayed along the entire length of the mandrel 16 so that the release of fiberglass pole 10 is easily accomplished upon completion. Also upon completion of the winding of filaments 42 around the mandrel 16, the vertically movable support 22 is lowered to disengage rollers 40 from the trunion 18. The fiberglass pole 10 is then pushed, by any means known in the art, off of the mandrel 16.

Figure 9:
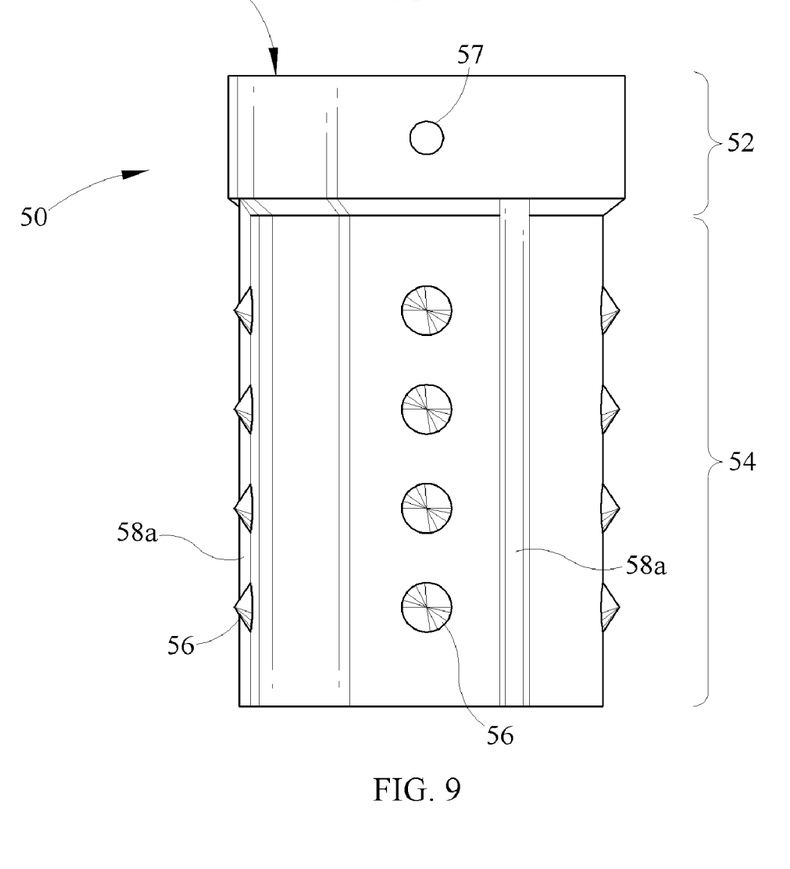
FIG. 9 is a side-view of a tenon collar for use in this embodiment of the present invention.
Figure 9A:
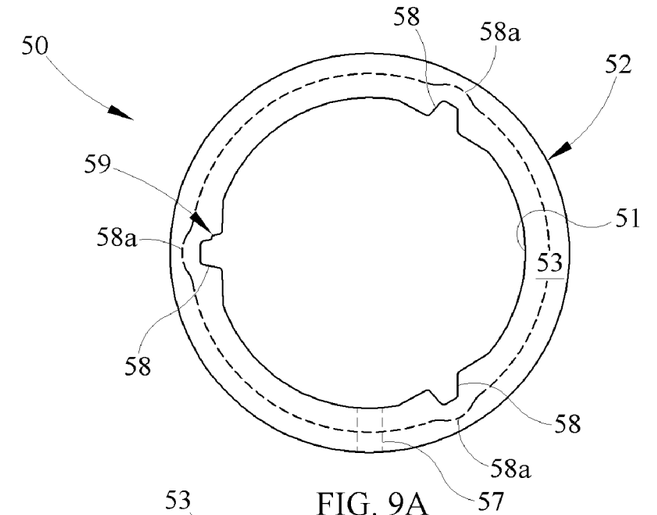
FIG. 9A is a top view of the tenon collar as illustrated in FIG. 9.

FIGS. 9 and 9A show one embodiment of tenon collar 50 adapted for winding into fiberglass pole 10 as shown in FIGS. 7 and 7A. The tenon collar 50 comprises a first end 52 and a second end 54, with projections 56 extending along the outer surface of the second end 54. Projections 56 facilitate the securing of fiberglass filaments 42 to the second end 54 upon the winding of the tenon collar 50 to the fiberglass pole 10. As shown in FIG. 7A, tenon collar 50 is held in place by means of the inter-engagement of projections 56 with the plurality of filament layers forming pole 10. The first end 52 of the tenon collar 50 is provided with a locking hole 57 extending radially from the outer surface to the inner surface of first end 52. Also as shown in FIGS. 9 and 9A, tenon collar 50 also contains longitudinal channels 58 extending axially along the inner surface of receptacle 51, and a positioning key slot 59 formed in one such channel 58. The positioning key slot 59 prevents misalignment when inserting a light attachment collar 60 into receptacle 51 of tenon collar 50. Also illustrated in FIGS. 9 and 9A, the outer longitudinal surface 58a of second end 54 is an increased wall thickness of material around each respective channel 58 to strengthen tenon collar 50 at the longitudinal channels 58.

Although the tenon collar 50 with its projections 56 is shown in detail in FIGS. 6-9A, the projections are merely representative of one embodiment of the present invention. The projections 56 can be arranged in any number of different patterns, quantities, sizes, shapes, and can be placed in various positions and still function to allow the windings of the filament 42 to inter-engage the projections along the outside of the wound-in tenon 12 (FIG. 2A) or wound-in tenon collar 50 (FIG. 7A) to hold them in place.

Figure 11:
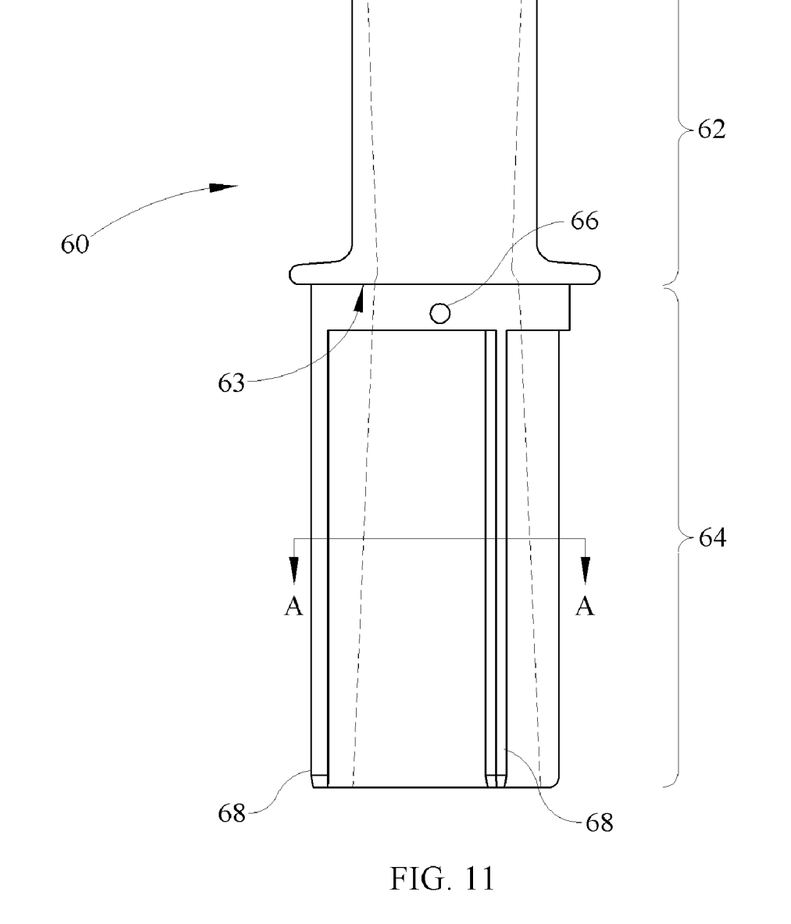
FIG. 11 is a side view of a light attachment collar to be used with the embodiments of the tenon collar.
Figure 11A:
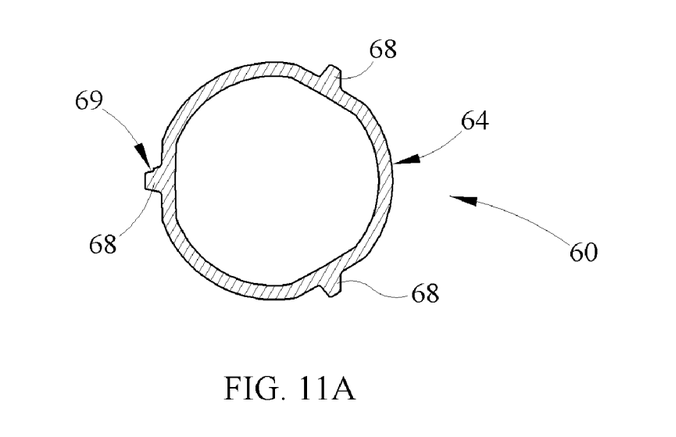
FIG. 11A is a cross-sectional view along line AA of the light attachment collar illustrated in FIG. 11.
Figure 12:
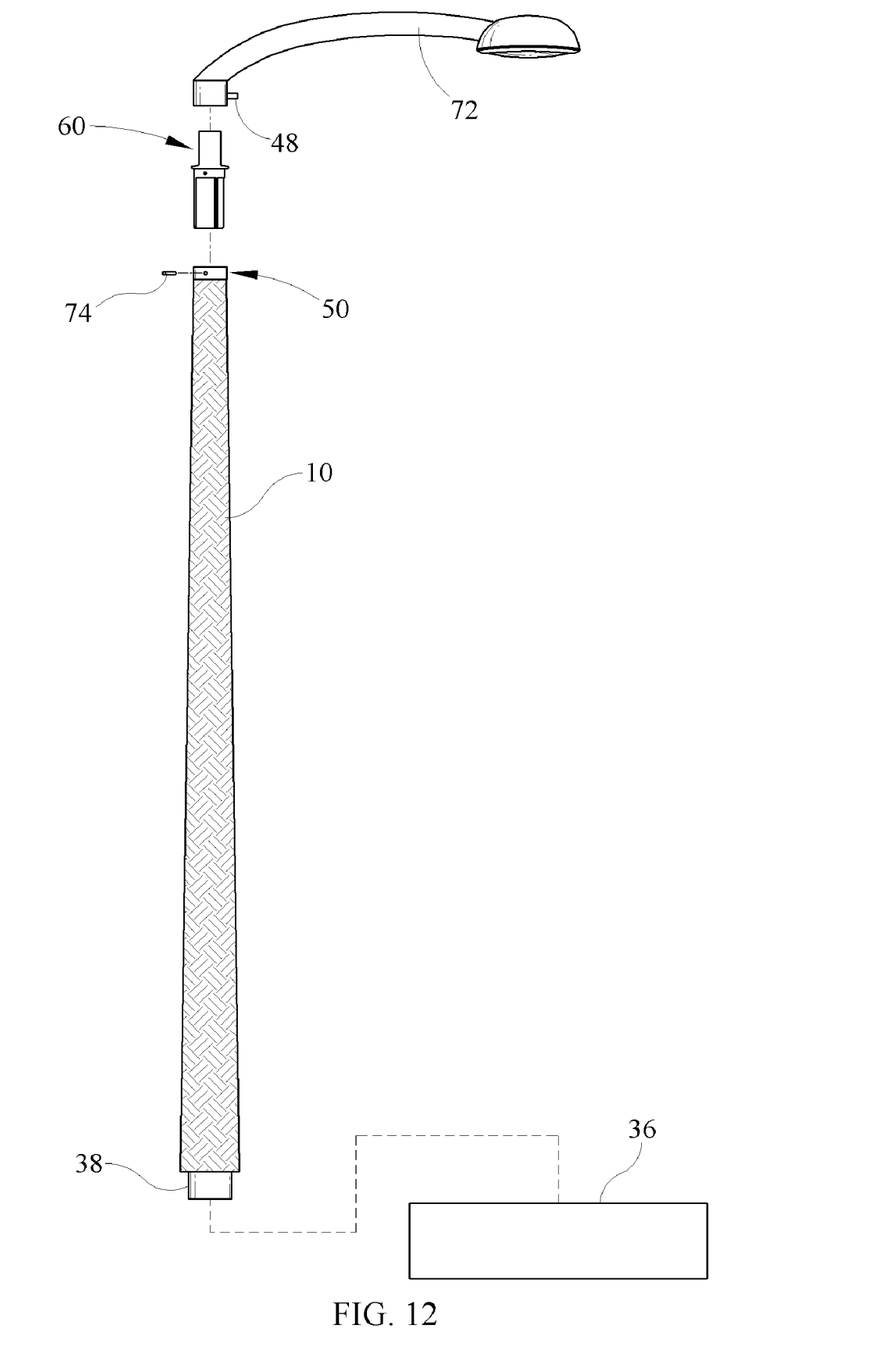
FIG. 12 is an exploded view of a modular pole system incorporating one embodiment of the tenon collar showing the attachment of a luminaire over a light attachment collar.

As shown in FIG. 11 and 11A, a light attachment collar 60, which is received into wound-in tenon collar receptacle 51, comprises a first end 62 and a second end 64. Second end 64 of light attachment collar 60 is adapted to be inserted into receptacle 51 of first end 52 of the tenon collar 50. Light attachment collar 60 also has a locking hole 66 radially extending from the outer surface to the inner surface of second end 64. Light attachment collar 60 also has longitudinal ridges 68 or splines that run axially along the outside surface of the second end 64 thereof as shown in FIGS. 11 and 11A. One of these longitudinal ridges 68 is provided with a positioning key 69 that will work in registry with the positioning key slot 59 of the tenon collar 50 to ensure that locking hole 57 of tenon collar 50 will align with locking hole 66 of light attachment collar 60 when the two are assembled. The two piece tenon assembly may then be secured together by insertion of a locking pin 74, or other securing device, as shown in FIG. 12. Additionally the longitudinal ridges 68 are sized and circumferentially spaced to be in registry with the longitudinal channels 58 of the tenon collar 50 when the two piece tenon assembly are assembled by telescopically inserting light attachment collar 60 into receptacle 51 of tenon collar 50 shown in FIG. 12. The longitudinal channels 58 and ridges 68 prevent rotational movement and increase rotational stability between light attachment collar 60 and tenon collar 50 when they are assembled. Also as can be seen from FIGS. 9, 9A, 11, and 12, upon insertion of light attachment collar 60 into receptacle 51 of tenon collar 50 to form the modular pole system, first end 62 of light attachment collar 60 has abutment surface 63 which abuts with the top surface 53 of the first end 52 of tenon collar 50.

The combination of light attachment collar 60 and tenon collar 50 as shown in detail in FIGS. 9, 9A, 11, and 11A is merely representative of one embodiment of the present invention. There are other possible functioning variations of the structural interaction between light attachment collar 60 and wound-in tenon collar 50 which will present themselves to one skilled in the art based on the teachings herein.

Wound-in tenon 50 and its corresponding light attachment collar 60 as used in this embodiment may be made from metallic materials, as well as from thermo-plastics such as polybutylene, polyethylene terephthalate, polyamides, glass filled polyamides, and the like. The continuous filament pole 10 may be made from fiberglass, epoxy resins or any other fibrous plastic materials as well as spun metallic materials which have good insulating properties.

As illustrated in FIG. 12, a completed continuous fibrous pole 10 and tenon collar 50 includes a base mounting end 38 for receipt into a support 36 which may be concrete, the earth or other prior art bases of various materials to which an elongated pole may be mounted. Also as shown in FIG. 12, luminaire 72 may be mounted onto light attachment collar 60 and held in place with one or more set screws 48 or other securing device. It is understood that there are many variations of luminaire that can be used with this embodiment of the present invention.

Figure 10:
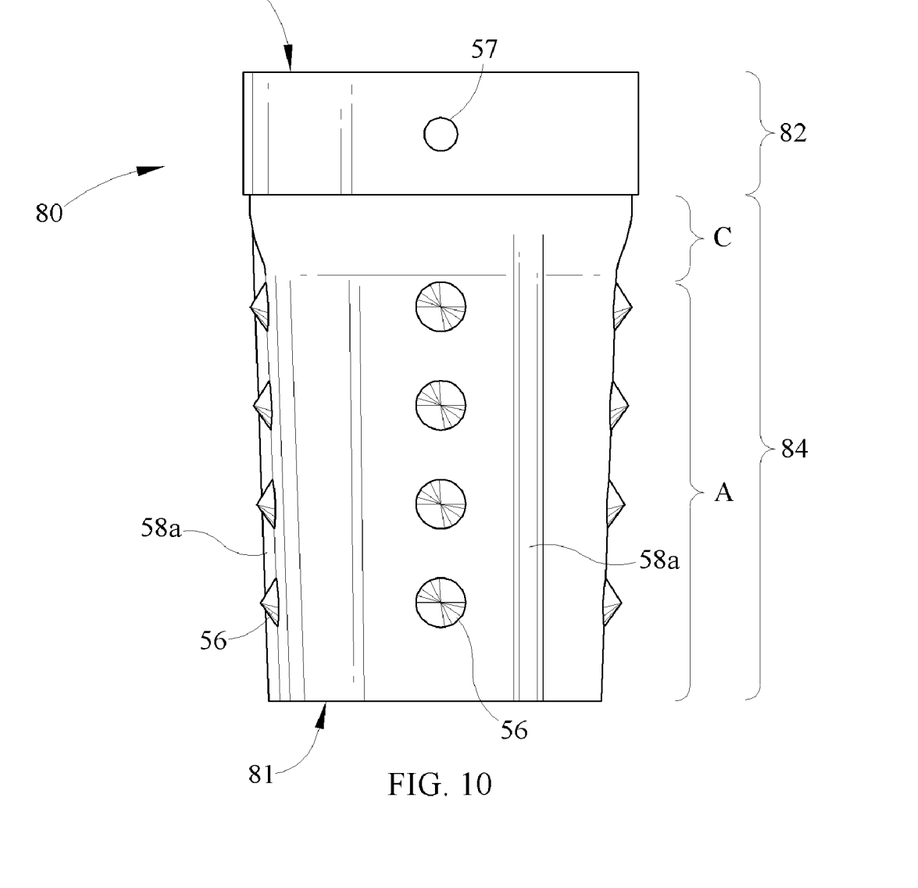
FIG. 10 is a side-view of another embodiment of the tenon collar.
Figure 10A:
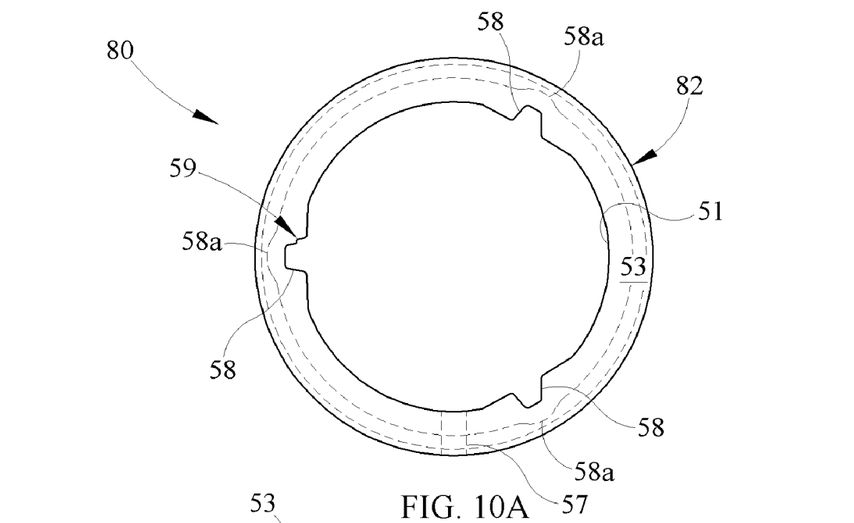
FIG. 10A is a top view of the embodiment of the tenon collar as illustrated in FIG. 10.

Another embodiment of tenon collar 50, illustrated as reference 80 in FIGS. 10 and 10A, allows for filaments 42 to maintain a substantially continuous taper along the entire length of pole 10 during the winding process. On second end 84, a curved taper C extends axially from the junction between first end 82 and second end 84 and transitions into an axial taper A. Axial taper A extends from curved taper C towards a terminating end 81 of second end 84. Axial taper A of second end 84 may be a pre-selected constant taper of about one degree. The curved taper C and the axial taper A of second end 84 allows for the filaments 42 to maintain a substantially continuous taper along pole 10 to the juncture between first end 82 and second end 84 during the winding process.

The detailed description is given primarily for clearness of understanding and no unnecessary limitations are to be understood therefrom for modifications will become obvious to those skilled in the art upon reading this disclosure and may be made without departing from the spirit of the invention and scope of the appended claims.

What is claimed is:

1. A modular pole system for a luminaire comprising:
   a continuous filament pole formed from a continuous filament winding process;
   a tenon collar having a first end and a second end, said second end integrated with a continuous filament forming said continuous filament pole, said second end having a plurality of projections extending outward and imbedded in said continuous filament; and
   said first end having a receptacle for receiving a light attachment collar having a lower end and an upper end, said upper end adapted to receive a light fixture.

2. The modular pole system of claim 1, wherein said tenon collar first end has an external diameter greater than an external diameter of said second end.

3. The modular pole system of claim 1, wherein said tenon collar first end has an external diameter about equal to the external diameter of said tenon collar second end integrated with said continuous filament.

4. The modular pole system of claim 1, wherein said second end of said tenon collar having a taper extending from the juncture between said first end and said second end to a distal end of said second end.

5. The modular pole system of claim 4, wherein said taper of said tenon collar second end further comprises a curved taper extending partially along said second end from the juncture between said first end and said second end.

6. The modular pole system of claim 1, wherein said continuous filament pole being fiberglass.

7. The modular pole system of claim 1, wherein said continuous filament pole having a taper from an opposed second end of said filament pole to the junction between said first end and said second end of said tenon collar.

8. The modular pole system of claim 7, wherein said taper being from about 0.12" per linear foot to about 0.16" per linear foot.

9. The modular pole system of claim 1, wherein said light attachment collar upper end having an external diameter greater than an external diameter than said lower end.

10. The modular pole system of claim 1, wherein said tenon collar having at least one axial groove positioned on an inner surface of said tenon collar in registry with at least one axial spline on an outer surface of said lower end of said light attachment collar.

11. A method of manufacturing an integral tenon collar and continuous filament pole system comprising the steps of:
   A. Placing a tenon collar over a trunion end of a mandrel;
   B. Winding a pre-selected thickness of a filament along the length of said mandrel up to and including a pre-selected length of said tenon collar to produce a tenon collar integrated into a first end of a pole section;
   C. Removing said resulting tenon collar and pole section from said mandrel and inserting a lower end of a light attachment collar into a receptacle of said tenon collar; and,
   D. Placing a luminaire onto an upper end of said light attachment collar.

12. The method of claim 11, wherein a terminating end of said pre-selected thickness along said tenon collar being about equal to the external diameter of an exposed outside diameter of said tenon collar.

13. The method of claim 11, wherein said pre-selected length of said tenon collar having a plurality of outwardly extending protrusions.

14. The method of claim 11, wherein said pre-selected thickness being tapered from a second end of said mandrel opposite a first end at said trunion, said thickness being greater at said second end than said first end of said mandrel.

15. The method of claim 11, wherein said pre-selected thickness taper being from about 0.1" per linear foot to about 0.16" per linear foot.

16. The method of claim 11, wherein said filament is fiberglass.

17. The method of claim 11, including a step of applying a mold release composition to said mandrel prior to winding said filament thereon.

18. The method of claim 11, wherein said mandrel having a taper from a second end to an opposed trunion end, said second end having a greater outside diameter than said trunion end.

19. The method of claim 18, said taper being from about 0.12" per linear foot to about 0.16" per linear foot of said mandrel.

20. An integral tenon collar and continuous filament pole, comprising:
   a tenon collar having a first end and a second end, said tenon collar first end having a receptacle, said second end integrated with a continuous filament forming said continuous filament pole, said second end having a plurality of outwardly extending projections, the outside surface of said second end having a taper extending axially from a proximate end at the juncture between said second end and said first end towards a distal end of said second end;
   a light attachment collar with a lower end and an upper end, said lower end received within said receptacle of said tenon collar first end, said upper end adapted to receive a luminaire; and
   an exterior of said light attachment collar lower end having a plurality of anti rotational protuberances engaging anti rotational devices on an interior surface of said receptacle of said first end of said tenon collar.

21. The filament pole of claim 20 wherein said taper of said tenon collar second end further comprises a curved taper extending partially along said second end from the juncture between said first end and said second end.

22. The filament pole system of claim 20, wherein said tenon collar first end having an external diameter greater than an external diameter of said second end.

23. The filament pole system of claim 20, wherein said tenon collar first end has an external diameter about equal to the external diameter of said tenon collar second end integrated with said continuous filament.

24. A filament pole system comprising:
   a continuous filament pole having an upper end and a lower end, said upper end of said continuous filament pole enwrapping a second end of a tenon collar;
   said tenon collar having a first end with an open aperture for receiving a light attachment collar having a first end and a second end, the exterior of said second end of said light attachment collar having a plurality of anti rotational protuberances engaging anti rotational devices in an interior surface of said open aperture of said first end of said tenon collar, said first end of said light attachment collar extending above said tenon collar and affixable to a light fixture;
   said continuous filament pole having a first taper from said lower end of said continuous filament pole to said upper end of said continuous filament pole;
   said second end of said tenon collar has a plurality of projections extending outward and imbedded in said continuous filament pole; and
   said second end of said tenon collar having a second taper to mate the diameter of said continuous filament pole adjacent said tenon collar.

* * * * *